Aug. 29, 1933.  C. P. BARKER  1,924,100
DRIER
Filed Jan. 9, 1931  3 Sheets-Sheet 1
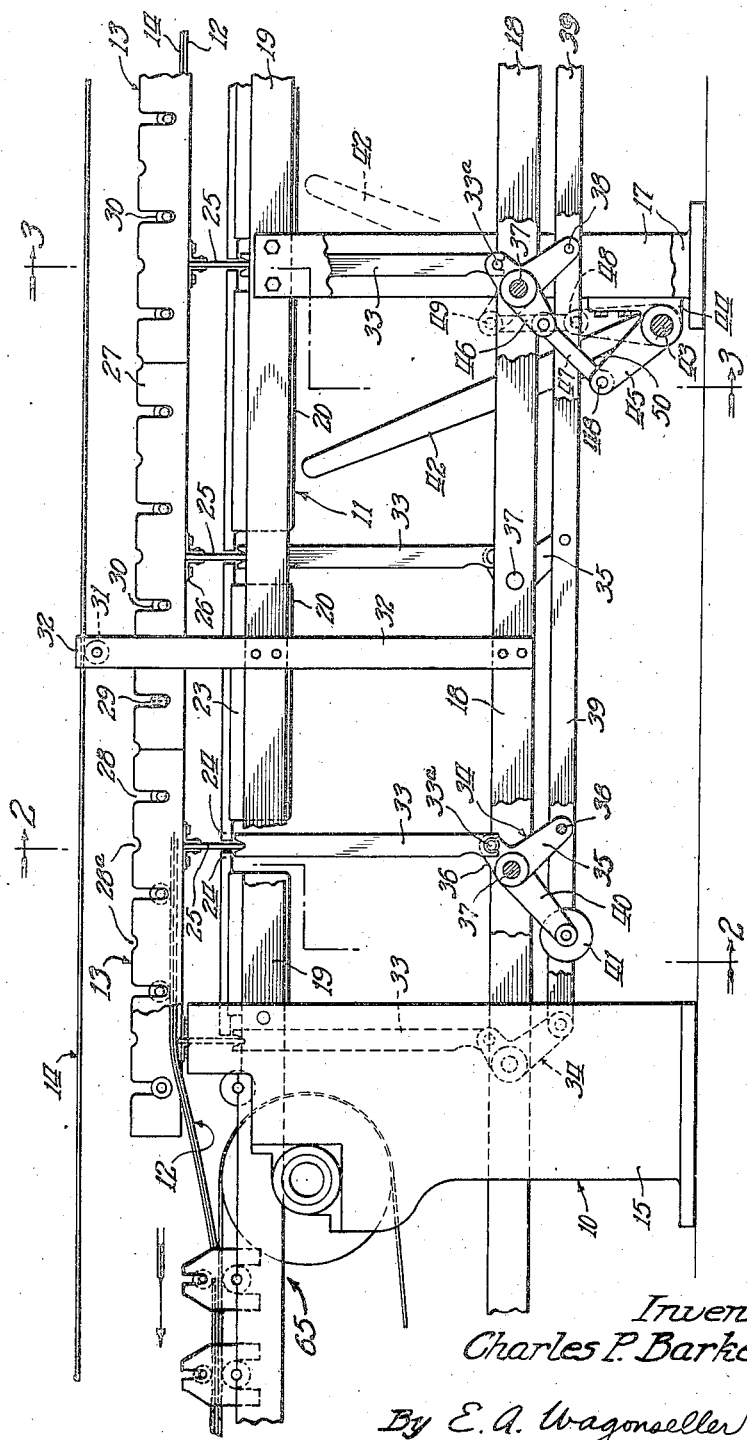
Inventor
Charles P. Barker
By E. A. Wagonseller
Atty.

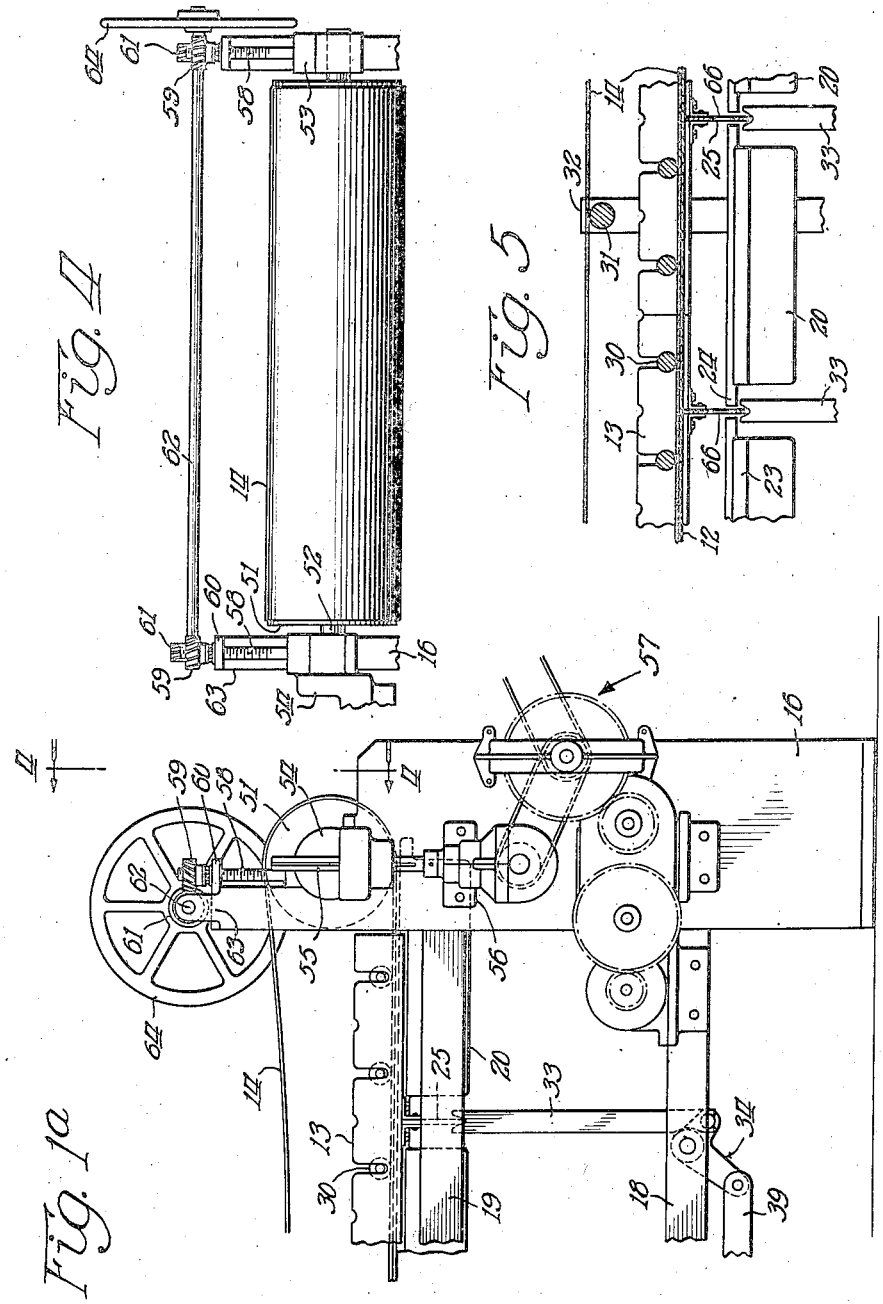

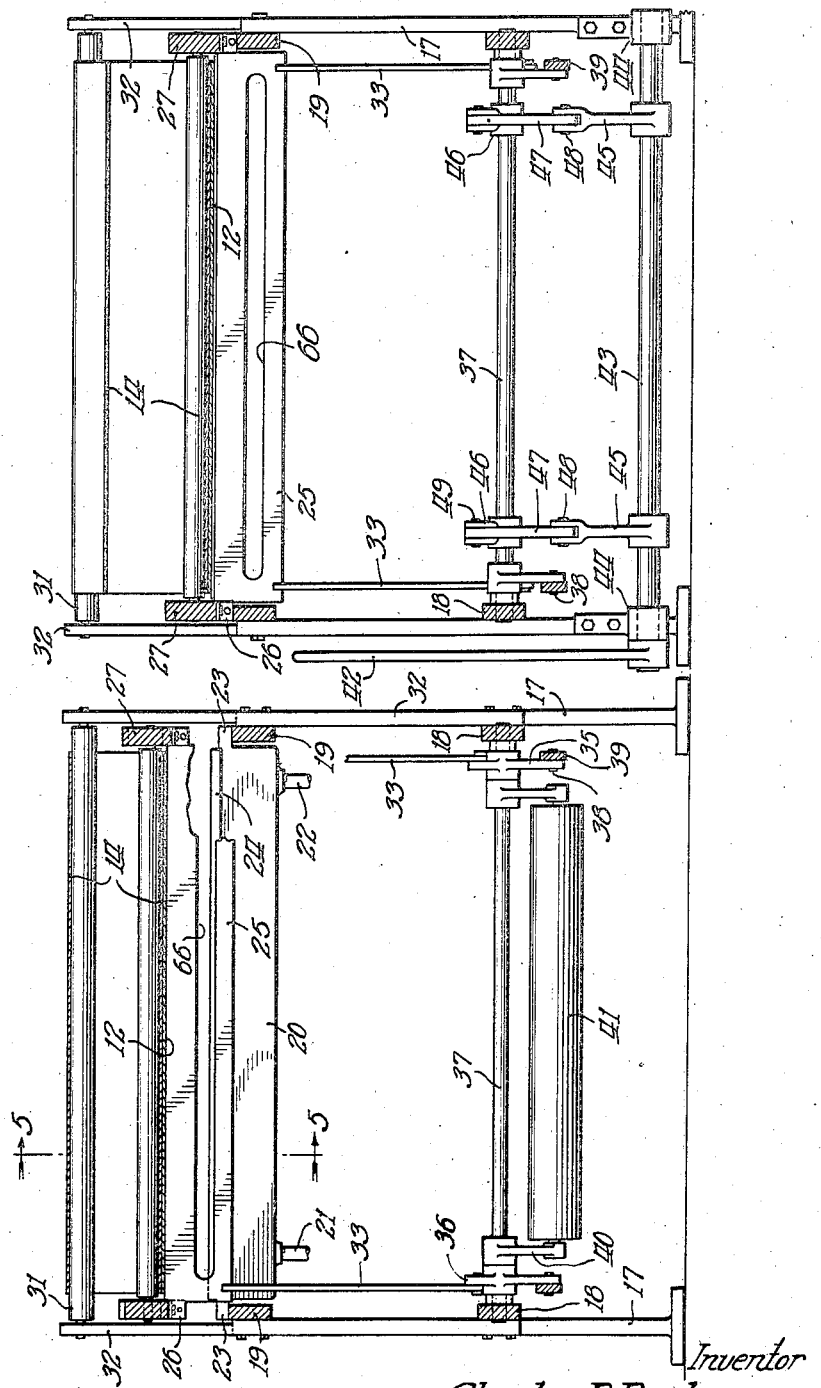

Patented Aug. 29, 1933

1,924,100

UNITED STATES PATENT OFFICE 1,924,100

DRIER

Charles P. Barker, Glencoe, Ill., assignor to Container Corporation of America, Chicago, Ill., a Corporation of Delaware Application January 9, 1931. Serial No. 507,600

4 Claims. (Cl. 34—48)

This invention relates to driers and more particularly to a construction for drying the adhesive applied to individual strips of sheet material after they have been brought together to form a laminated sheet.

One object of the invention is to generally improve and simplify a construction of this type, whereby a drier is provided which will be more efficient in use, easier to clean and less likely to cause injury to the finished laminated sheet when its movement through the drier is temporarily stopped.

Another object is to combine, in a device of the class described, a mechanism for exerting pressure against the laminated sheet to hold it in intimate contact with a suitable heated surface, together with effective means whereby the laminated sheet and the heated surface may be temporarily separated from each other.

A further object is to provide a counterbalanced lifting mechanism by which the sheet and pressure applying device may be conveniently raised manually by the operator, without undue exertion.

To these and other ends the invention resides in certain improvements and combinations of parts, all as will be hereinafter more fully described, the novel features being pointed out in the claims at the end of the specification.

Fig. 1 illustrates, in side elevation, one portion of the drying equipment adjacent the discharge end of the drier and showing the sheet out of contact with the drying surface;

Fig. 1a is a view in side elevation, similar to Fig. 1 and showing the receiving end of the drier;

Fig. 2 is a sectional view taken on line 2—2 of Fig. 1;

Fig. 3 is a view in cross section taken substantially on line 3—3 of Fig. 1 with the exception that the sheet is shown in contact with the heated surface;

Fig. 4 is a fragmentary end view of the machine, looking toward the left in Fig. 1a from the line 4—4 and showing the mechanism for raising the driving roll for the canvas belt; and Fig. 5 is a sectional view on line 5—5 of Fig. 2.

Similar reference numerals throughout the several views indicate the same parts.

The present embodiment of the invention provides a drying mechanism particularly adapted for use with machinery for forming so-called corrugated board, made up of a corrugated strip and one or more liner strips, although the device is equally adapted for use in drying other types of laminated material, where it is desired to quickly dry the adhesive material employed in securing the laminations together. The constructions heretofore employed for this purpose have been more or less inefficient and wasteful of material due to the fact that the assembled laminated sheet remains in the drier and in intimate contact with the heated drying surfaces during the intervals when the machine is stopped for any purpose, such as to repair a break or to effect some adjustment. When the drying machine is stopped, with the newly formed sheet remaining in contact with the heated drying surfaces, the fibres of the sheet are rendered weak and brittle due to overheating and the sheet is frequently badly damaged if not rendered totally useless.

The present invention overcomes this difficulty by providing means whereby, as soon as the movement of the sheet through the drier stops, the sheet may be lifted or moved out of contact with the heated surface of the drying unit so that the length of time the sheet remains in the drier is practically immaterial as the sheet is not subject to the deteriorating effects of long heating, consequently no part of the sheet needs to be discarded.

The present invention, as disclosed, embodies a heating unit over which the sheet to be dried is adapted to travel, a means for moving the sheet along the heated surface, pressure means for maintaining the sheet in intimate contact with the heating surface and mechanism whereby the sheet may be quickly and efficiently raised out of contact with the heating surface.

Referring more particularly to the drawings, there is provided a base frame 10, supporting a drying unit, designated generally at 11, over which a newly formed sheet 12 is adapted to travel, the sheet being held in contact with the drying unit 11 by means of a pressure mechanism 13, which includes a suitable driven belt 14, resting upon the sheet 12 and carrying the sheet frictionally therewith.

The frame 10 includes suitable end frame members 15 and 16 and one or more intermediate frame members, indicated at 17. Suitable longitudinal frame members 18, 18 and 19, 19 are employed which are bolted, riveted or otherwise secured to the frame members 15, 16 and 17. The lateral spacing of the respective frame members 15, 16 and 17 and their associated longitudinal members 18 and 19, is such as to provide a machine which is somewhat wider than the maximum width of the sheet to be produced.

The heating unit 11 may take various forms but is preferably in the form of one or more hollow chambers adapted for circulation of steam therethrough. In the present instance the heating unit is illustrated as comprising a plurality of individual sections 20, 20, in the form of hollow boxes having suitable pipe connections 21 and 22 for the circulation of steam or other heating fluid.

The heating sections 20, 20 are suitably supported on the frame 10 and for this purpose there are provided projecting portions 23, 23 integral with or otherwise formed on the sections and projecting laterally therefrom a sufficient distance to rest securely upon the upper edges of the frame members 19, 19 on each side of the base frame. The sections 20, 20 also preferably have projecting flanges 24, 24 on the sides disposed transversely of the base frame, see Fig. 1.

While the sections 20, 20 may be arranged side by side in abutting relation, they are preferably spaced somewhat apart for the purpose of receiving between them suitable transverse members in the form of bars 25, 25 suitably secured adjacent their ends, as by means of brackets 26, to the pressure mechanism 13. The bars 25, during normal operation of the drier, are disposed with their upper edges substantially flush with or somewhat below the surfaces of the sections forming the heating unit 11 so that the entire surface of the heating unit will be substantially unbroken and unobstructed by the top edges of the bars.

The pressure mechanism preferably comprises side members 27, 27 in which are suitable bearing surfaces, in the form of notches 28, in which spindles 29 on rolls 30 are received. Rolls 30 are adapted to exert pressure on sheet 12 and the notches 28 are formed to allow for upward movement of the rolls 30 to compensate for irregularities in the thickness of the sheet so that the weight of the rolls will exert a substantially uniform pressure on the sheet. It will be noted that when the sheet is passing beneath the rolls, the spindles are not resting on the bottom of the notches.

Auxiliary notches 28a are provided which are capable of supporting the spindles of the rolls 30 when it is desired to maintain one or more of the rolls out of operation and thus lessen the pressure on the sheet 12.

The belt 14 provides a means for moving the sheet 12 through the machine and cooperates with and forms a part of the pressure mechanism. This belt, formed of canvas or any other suitable material, is adapted to rest upon the upper surface of the heating sections 20 until the sheet 12 begins to pass through the drier. The rolls 30 rest upon the upper surface of the lower run of the belt so that the weight of the rolls is transmitted through the belt to the sheet passing through the drier. The belt is driven by suitable mechanism to be later described. The upper run of the belt may be conveniently supported by rollers 31 journalled in auxiliary frame members 32, 32 suitably secured to frame members 18 and 19 at each side of the drier. Obviously, if desired, the belt may be made of sufficiently heavy material to obviate the necessity of having rolls for exerting pressure on the sheet.

Means are provided for lifting the pressure mechanism 13 and the attached bars 25 away from the heating unit 11. In the present instance this means comprises vertically disposed bars or links 33, 33 which may be engaged in any suitable manner with the pressure mechanism. As herein shown, the links 33 are suitably notched at their upper ends to receive the lower edge of the bars 25. In the present instance two links 33, 33 are provided for each bar 25, one on each side of the drier and adapted to engage the bars near their ends. While the links 33 are preferably adapted to engage the lower edges of the bars 25 it will be obvious that these links 33 may engage directly below the bearing members 27.

While various methods may be employed for lifting the links, this is preferably done by means of a plurality of bell crank levers 34, 34, each comprising arms 35 and 36, pivoted on suitable shafts 37, 37 supported in the longitudinal frame members 18. The arms 36 of the bell crank levers are pivotally connected at 33a to the lower ends of the links 33. The lower arms 35 of the bell crank levers are pivotally connected at 38 to a longitudinally extended bar 39 so that by lengthwise movement of this bar the bell crank levers may be rocked to thus raise or lower the pressure mechanism 13 through the engagement of the links 33 with the transverse bars 25.

The link system for raising the pressure mechanism is preferably counterbalanced to facilitate the raising and lowering movements. For this purpose arms 40, 40 are suitably keyed to one or more of the shafts 37 so as to extend from the shaft in a direction away from the pivot points 33a and 38. The arms 40 support between them at their ends a weight 41 connected in any suitable manner with the arms. The weight of the counterbalancing weights 41 is preferably sufficient to substantially balance the pressure mechanism.

The longitudinal bars 39, 39 may be moved endwise by any suitable means, such as a motor or by hand or foot power. In the present instance this is preferably done by hand power. For this purpose there is provided a hand lever 42, suitably keyed or otherwise secured to a transversely extending shaft 43, journalled at its ends in bearing brackets 44, 44 secured to one pair of frame members 17, 17 see Figs. 1 and 3. A pair of arms 45, 45 is keyed to the shaft 43. These arms are operably connected to the adjacent shaft 37 to cause rotation of said shaft. For this purpose there is provided on the shaft 37 a pair of arms 46, 46 keyed thereon to rock therewith. The ends of arms 45 and 46 are pivotally connected to opposite ends of links 47, at 48 and 49, see Figs. 1 and 3.

The lever and link system just described preferably includes means whereby the pressure mechanism may be held substantially locked in its lowered position. For this purpose the arm 45 and the link 47 are arranged to provide the well known toggle locking mechanism.

As shown in Fig. 1 when the hand lever is moved to the right, the position of the parts 45, 46 and 47 are substantially as shown in dotted lines. In this position the pivot 48 will have moved beyond the straight line between the centers of pivots 43 and 49, thus effectively locking the parts. The toggle lock thus formed may be readily broken by moving the lever 42 toward the left as shown in Fig. 1. By reference to Fig. 1a it is apparent that the movement of hand lever 42 toward the right (see Fig. 1) is limited, due to the fact that the links 33 contact the bosses of their respective bell crank levers 34 when the pressure mechanism is in lower position.

Any suitable arrangement may be employed for locking the lever 42 in position to hold the pressure mechanism, in its raised position. This may be done by means of a suitable pin or bolt which engages within registering apertures in the arm 42 and the adjacent frame piece 18.

For the purpose of preventing the arm 46 and link 47 from locking in the left hand position of the hand lever 42 there is provided a suitable stop 50 on arm 45 which is adapted to be engaged by the links 47 to limit its clockwise swinging movement with respect to arm 45.

The means for driving the belt 14 will now be described. Any suitable means may be employed for driving the belt but in the present instance the driving means is preferably arranged and constructed so that the driving end of the belt may be raised or lowered in coordination with the raising and lowering of the pressure mechanism. The belt 14 is arranged over a driven drum 51 having a shaft 52 journalled at one end in a bearing bracket 53 and at the other end in a bearing formed in a combined bearing and gear housing 54.

Within the housing 54 are arranged intermeshing bevelled gears, not shown, one of which is keyed to the shaft 52 of the drum and the other of which is slidably keyed on a vertical shaft 55, journalled in a bearing 56 secured to the frame member 16 of the drier. The shaft 55 is suitably secured against endwise movement and carries suitable gearing on its lower end by means of which it may be driven from the driving mechanism indicated generally at 57.

In order to raise and lower the drum 51 the housing 54 and the bearing 53 are each provided with a threaded post 58 secured from rotation and having its threaded end supported in an interiorly threaded worm gear element 59, rotatably mounted on an anti-friction bearing on a bracket member 60. The worm gears 59 are rotated in unison by means of intermeshing worm elements 61 keyed to a shaft 62 mounted at its ends in bearings 63 supported on the frame member 16. The shaft 62 is provided with a suitable hand wheel 64 by which it may be conveniently rotated. By this construction rotation of the hand wheel in one direction or the other will, through the intermediary of gears 59 and 61 and threaded post 58 raise or lower the driving roll 51.

Means are preferably provided whereby cleaning of the surface of the drying unit is facilitated. For this purpose, openings or slots 66 are formed in the bars 25, the slots being wide enough for the introduction of a suitable scraper or other similar tool therethrough. The position of the slots 66 in the bars 25 is such as to bring the lower edge of the slots substantially flush with or somewhat below the plane of the upper surface of the drying unit when the bars 25 are in raised position, see Fig. 2. This arrangement is particularly advantageous where glues and adhesives similar to silicate of soda are employed. This type of adhesive, as usually applied, runs out from the edges of the newly formed sheet and is deposited upon the drying surface. Every hour or two it becomes necessary to clean up these deposits and when this is necessary the forming machine is stopped and the sheet is lifted by means of bars 25 away from the drying unit after which a suitable scraper or tool is inserted and these deposits of adhesive are knocked loose and removed from the drying unit. The slots 66 permit the movement of the scraper from one to the other of the sections 20 forming the drying unit.

After the finished sheet leaves the drier it passes to suitable conveying mechanism indicated generally at 65, by means of which it is conveyed to conventional cut off mechanism where the finished sheet is cut into convenient sizes.

The drier herein described is preferably arranged in line with suitable machinery for applying adhesive to the various individual units and joining them to form the laminated sheet. In the case of corrugated paper board, the forming machine will also include corrugating rolls as a part thereof.

In the use and operation of the device, the driving mechanism for the belt 14 will be elevated and the pressure mechanism will be raised sufficiently to facilitate the introduction of the end of a newly formed sheet in the drier. The unit 11 will then be heated to the desired temperature, after which the forming and assembling machine will be put in operation. As soon as the end of the sheet enters the mechanism the belt driving means is lowered so as to subject the sheet to the pressure of the belt 14 and the rolls 30. So long as the forming machine is operating normally, the drier will be maintained with its parts in the relation just described. However, if any trouble develops, occasioned by the breaking of one of the sheets forming the laminated board or in case it is desired to make any adjustment which requires stopping the forming machine, the hand wheel 64 will be rotated in the appropriate direction to raise the driving roll and the sheet in the drier will be removed from its intimate contact with the drying unit 11 by shifting the hand lever 42 from its dotted line position to full line position, as shown in Fig. 1. The sheet is thus held by the edges of the bars 25 out of contact with the surface of the drying unit and will not be subjected to damage of overheating and burning, and, therefore, need not be discarded after the operation of the forming machine has again been resumed.

When it is desired to clean deposits of adhesive from the face of the drying unit this can be done when the sheet has been raised away from the unit and is facilitated by the slots 66 in the bars 25 which permit the passage of a scraper from one section to the other of the drying unit.

After the drying machine is ready for resumed operation the hand lever 42 will be moved back to the right, as shown in dotted lines in Fig. 1 and the hand wheel 64 will be rotated in the appropriate direction to lower the driving roll 51 to its normal working position upon which the sheet is again ready to resume its travel through the drier.

From the foregoing it is apparent that the present invention provides a convenient and efficient drying device, made up of relatively simple parts, easily controlled and adjusted and not likely to get out of order. The moving parts of the drier are, at all times, under substantially instant control thereby protecting the sheet from the deteriorating effects of overheating in case it is necessary for any reason to stop the machine forming the sheet to be dried. Due to the effective counterbalancing of parts no undue exertion need be employed on the part of the operator when he desires to lower or raise the sheet into or out of contact with the drying surface. The toggle locking feature of the links and bell crank levers, as described, insures that the pressure mechanism will be constantly operative unless conscious effort is put forth on the part of the operator to render it inoperative.

While the present description sets forth a preferred embodiment of the invention, numerous changes may be made in the construction without departing from the spirit of the invention, and it is therefore desired that the present embodiment be considered in all respects as illustrative and not restrictive, reference being had to the appended claims rather than to the foregoing description to indicate the scope of the invention.

I claim:

1. A drier including a heating unit having a surface along which a sheet of material to be dried is adapted to move, said heating unit having spaced openings through at least a portion of its length, bars disposed in said openings and normally adapted to lie with their upper edges substantially flush with the surface of said drying unit, spaced bearing members associated with said bars and disposed adjacent the ends thereof and substantially at right angles thereto, bearing surfaces formed in said members, rolls associated with said members, spindles at the ends of said rolls resting in oppositely disposed bearing surfaces on said members, the size of the rolls and the position of the bearing surfaces being so arranged with respect to the adjacent edges of said bars that a sheet may be guided between said rolls and said bars so as to travel in substantially a single plane, means associated with said bars for lifting them, substantially in unison, away from the heating unit to remove the sheet from contact with said unit.

2. A drier comprising a unit having heating surfaces lying substantially in a single plane and over which a strip of sheet material to be dried is adapted to move, means for exerting pressure on said sheet to hold it in contact with the heating surfaces, said means comprising spaced bearing members adjacent the transverse edges of said heating surfaces, and having bearing surfaces formed therein, rolls associated with said bearing members, spindles at the ends of said rolls resting in oppositely disposed bearing surfaces on said members, a driven belt adapted to engage the upper surface of said sheet to move it over said heating surfaces, said belt being disposed beneath said rolls, said unit having a plurality of laterally extending spaced openings separating said heating surfaces throughout at least a portion of its length, bars disposed in said openings and normally adapted to lie with their upper edges substantially flush with the surface of said unit, and means associated with said bars for moving said bars bearings members, rolls and sheet in a direction away from said heating surfaces.

3. A drier comprising a unit having a plurality of heating surfaces over which a strip of sheet material to be dried is adapted to travel, pressure mechanism arranged above said heating surfaces adapted to maintain the sheet in contact therewith, said unit having a plurality of laterally extending spaced openings separating said heating surfaces, and means associated with the pressure mechanism for lifting said pressure mechanism and said sheet away from the heating surface, said means including bars disposed in said spaced openings of the unit and normally adapted to lie with their upper edges flush or slightly below the surface of said unit.

4. A drier comprising a unit having a plurality of heating surfaces over which a strip of sheet material to be dried is adapted to travel, pressure mechanism adapted to maintain the sheet in contact with said heating surface, said unit having a plurality of laterally extending spaced openings separating said heating surfaces, and means associated with the pressure mechanism for lifting said pressure mechanism and said sheet away from the heating surfaces, said means including bars disposed in said openings in said unit and normally adapted to lie with their upper edges in such a position that they will offer no obstruction to said sheet passing over said heating surfaces.

CHARLES P. BARKER.